United States Patent [19]
Gohara et al.

[11] Patent Number: 5,648,022
[45] Date of Patent: Jul. 15, 1997

[54] WET FLUE GAS SCRUBBER HAVING AN EVENLY DISTRIBUTED FLUE GAS INLET

[75] Inventors: Wadie F. Gohara, Barberton; George B. Watson, Alliance; Randy J. Reynolds; Thomas W. Strock, both of Canton, all of Ohio

[73] Assignee: The Babcock & Wilcox Company, New Orleans, La.

[21] Appl. No.: 620,692

[22] Filed: Mar. 21, 1996

Related U.S. Application Data

[62] Division of Ser. No. 388,708, Feb. 14, 1995, Pat. No. 5,558,818.

[51] Int. Cl.⁶ ........................................................ B01F 3/04
[52] U.S. Cl. ........................ 261/17; 261/79.2; 261/DIG. 9
[58] Field of Search .......................... 261/79.2, DIG. 9, 261/17, 96

[56] References Cited

U.S. PATENT DOCUMENTS

| | | | |
|---|---|---|---|
| 3,343,341 | 9/1967 | Wiemer | 261/DIG. 9 |
| 3,488,960 | 1/1970 | Kirkpatrick | 261/17 |
| 4,008,056 | 2/1977 | Potter | 261/79.2 |
| 4,320,092 | 3/1982 | Kondo et al. | 261/79.2 |
| 5,106,544 | 4/1992 | Lee et al. | 261/79.2 |
| 5,145,612 | 9/1992 | Reay et al. | 261/79.2 |
| 5,516,465 | 5/1996 | Yeoman | 261/79.2 |

FOREIGN PATENT DOCUMENTS

| | | | |
|---|---|---|---|
| 0092125 | 7/1980 | Japan | 261/17 |

*Primary Examiner*—Tim R. Miles
*Attorney, Agent, or Firm*—Daniel S. Kalka; Robert J. Edwards

[57] ABSTRACT

A wet flue gas desulfurization scrubbing tower has means therein for evenly distributing the flue gas flowing through the tower for more efficient treatment therein including a ring plenum for evenly exhausting the flue gas around the periphery of the tower through a series of differently sized openings and a centrally located annular opening for evenly exhausting the flue gas to the center of the tower.

7 Claims, 3 Drawing Sheets

WET FLUE GAS SCRUBBER HAVING AN EVENLY DISTRIBUTED FLUE GAS INLET

This is a divisional of application Ser. No. 08/388,708 filed Feb. 14, 1995, now U.S. Pat. No. 5,558,818.

BACKGROUND OF THE INVENTION

1. FIELD OF THE INVENTION

The present invention relates to wet flue gas desulfurization scrubbers generally and more particularly to the design of such scrubbers for even flue gas flow therethrough.

2. DESCRIPTION OF THE RELATED ART

Most wet scrubbers are designed as a spray tower. The tower is designed so that, at maximum load, the average superficial gas velocity does not exceed the design gas velocity. For most spray towers, the average gas velocity varies from about 8 to 13 ft/sec. (2.4 to 4 m/sec) based upon scrubber outlet conditions. A typical design velocity for a limestone wet scrubber is about 10 ft/sec (3.1 m/sec).

The flue gas enters the absorber from a side inlet having an awning in some cases. This tends to cause gas flow nonuniformity in the tower. This nonuniformity reduces overall $SO_2$ removal performance and aggravates mist eliminator carryover. The absorber design incorporates a sieve or perforated plate tray which somewhat reduces the flue gas flow maldistribution. The pressure drop across the tray is usually between 1 to 3 in. Mg (0.2 to 0.7 kPa). Towers with multiple trays have also been built. The design of the tower is influenced by the reagent (lime or limestone, for example), the desired $SO_2$ removal level, the tradeoff between fan power and recirculation lime slurry pump power, and several other factors.

Spray nozzles are used in wet scrubbers to control the mixing of lime slurry with the flue gas. The operating pressures typically vary between about 5 and 20 psi (34 and 138 kPa). Spray nozzles without internal obstructions are favored to minimize plugging by trapped debris. Although plugging could be minimized by using a minimum number of large spray nozzles, flow maldistribution would most likely occur. Therefore, several smaller nozzles are usually preferred. Ceramic nozzles are commonly used.

The large lime slurry tank at the bottom of the spray tower is called the reaction tank or the recirculation tank. The volume of this tank permits several chemical and physical processes to approach completion.

Gas liquid contacting is essential in the described towers to achieving high efficiency pollutant removal and to improve reagent utilization. Gas distribution suffers as the inlet gas velocity in particular and the absorber gas velocity in general increase. Field data at a nominal average gas velocity 15.9 fps showed that the gas flow in the rear of the absorber under the tray was 16% above the average, while the gas flow in the front was 23% below the average. The corresponding values above the tray were 13%, 92%, and 96% of the average flow. Meanwhile, at a nominal average gas velocity of 10 fps the gas distribution under and above the tray indicated that the gas flow is more evenly distributed.

As the gas distribution in the absorber tower is distorted, the gas/liquid disproportionation becomes significant and possibly damaging to the process efficiency as the gas velocity exceeds 11.5 fps and approaches 20 fps. Two factors affect the gas distribution:

1. The momentum of the entering gas forces the gas towards the rear of the absorber allowing the liquid to flow unchallenged at the front of the vessel.

2. As the gas and liquid segregate and the liquid flows towards the front of the absorber, the resistance to the gas increases thus forcing the gas to enter the vessel from the sides of the inlet between the side shields of the awning to the sides and the liquid curtain falling in the middle of the inlet. This distortion of flow aggravates the flow distribution problem.

Awnings at the side flue gas inlet, while protecting the inlet from wet/dry interface growths and wetness, contribute to the problem by providing resistance to the gas at the center of the inlet. The thick liquid layer falling off the awning forces the gas to enter the absorber from the sides. The gas follows the absorber walls to the rear end of the absorber and loses its momentum as it turns upward at the rear of the absorber. As the gas flows towards the rear of the absorber, it forces the liquid toward the front increasing the density of the awning liquid curtain which in turn force the gas to the sides. In addition to the damaging potential of gas maldistribution, maintaining the same inlet flow area required for a 10 fps absorber, the high gas velocity in the inlet results in a high inlet pressure drop and high gas momentum which contributes to the gas maldistribution problem.

Reducing the inlet gas velocity to the acceptable 3000 fpm will result in either a very wide inlet that complicates the mechanical design of the inlet, or requires increases in the inlet height which defeats the purpose of high velocity absorbers namely to reduce the size of the vessel.

Thus the prior art fails to provide an absorber tower which would meet the following requirements:

1. Reduce the gas inlet velocity without increasing the absorber height.

2. Introduce the gas in a manner that promotes even gas distribution and adequate humidification.

3. Reduce the resistance of the liquid falling from the absorption section of the absorber to the entering gas.

4. Distribute the gas and liquid evenly across the inlet resulting in a lower inlet pressure drop, thorough humidification of the entering gas, provide maximum gas liquid contact, and improve the reagent utilization.

SUMMARY OF THE INVENTION

The present invention solves the problems associated with the prior art scrubbers as well as others and meets the above-mentioned scrubber requirements by providing an improved scrubber inlet which provides evenly distributed inlet flue gas.

To accomplish this the scrubber inlet is designed so as to introduce the gas through multiple inlet ports located in the scrubber tower without a substantial increase in the absorber tower height. This eliminates the need for an inlet awning and utilizes the absorber walls to perform the traditional functions of the awning. The new inlet ports are located in the inclined transition surface between the flared tank and the absorption section of the absorber. The incoming flue inlet connects to a plenum that surrounds the lower portion of the absorption tower section. Openings or ports are located radially around the circumference of the plenum which is located around the inclined transition between the reagent tank and the absorption section of the tower. The size, number and location of the openings varies from the front of the absorber (the direction where the gas flue comes) to the rear. The front port openings are made smaller than the back to force the gas through the plenum to the back openings of the plenum. Splitters may be located at proper locations in the flue and are used to help redistribution of the gas.

The bottom edge of the absorption section of the absorber tower above the plenum is made to extends 6 to 8 inches above the plenum with the transition piece forming an inclined lip to prevent back flow of slurry on the inside surfaces of the incline covering the plenum. Slurry dripping of the lip perform the same functions as the slurry curtain falling from the awning of known absorbers. The number and flow area of the openings will determine the entering gas velocity which is controlled so that 3000 fpm is maintained without increase in the absorber height. The falling slurry film falling off the walls of the absorption section is thinner than the curtain and is evenly distributed along the perimeter of the absorber providing an equal resistance to the entering gas, thus, preventing channeling of the gas through zones of low resistance.

Another embodiment of the present invention provides a center inlet. In this arrangement the inlet flue penetrates the absorber under the liquid level in the recirculation tank. The inlet wraps around a vertical well in the center of the tank and forms a vertical concentric gas path around the vertical well. The outer walls of the concentric gas inlet extend above the operating liquid level at the center of the absorber. The top of the well extends above the outer walls the vertical inlet and flares to cover the gas inlet. The flared end of the well is provided to protect the inlet from the falling slurry. The inlet and the cover are located above the liquid level and below the transition between the tank and the absorption section of the absorber. The contraction of the absorber height helps to redirect some of the gas towards the center of the absorber. The 360 degree flue outlet allows the distribution of gas all around the absorber. The slurry falling off the inlet cover falls evenly and forms a continuous thin humidifying film for the flue gas passing therethrough thus performing the function of a conventional awning. The bottom of the well is slotted to allow the spray slurry excess to collect in the well and to mix with the rest of the slurry at the bottom of the tank. The entering gas is forced towards the walls of the tank and tends to hug the walls.

In view of the foregoing it will be seen that one aspect of the present invention is to provide an absorption tower having reduced flue gas velocity without increased tower height.

Another aspect is to provide a flue gas inlet into the absorption tower which will provide even flue gas distribution into the tower.

These and other aspects of the present invention will be more fully understood after a review of the following description of the preferred embodiment when considered along with the associated drawings.

DESCRIPTION OF THE PREFERRED EMBODIMENT

Figure 1:
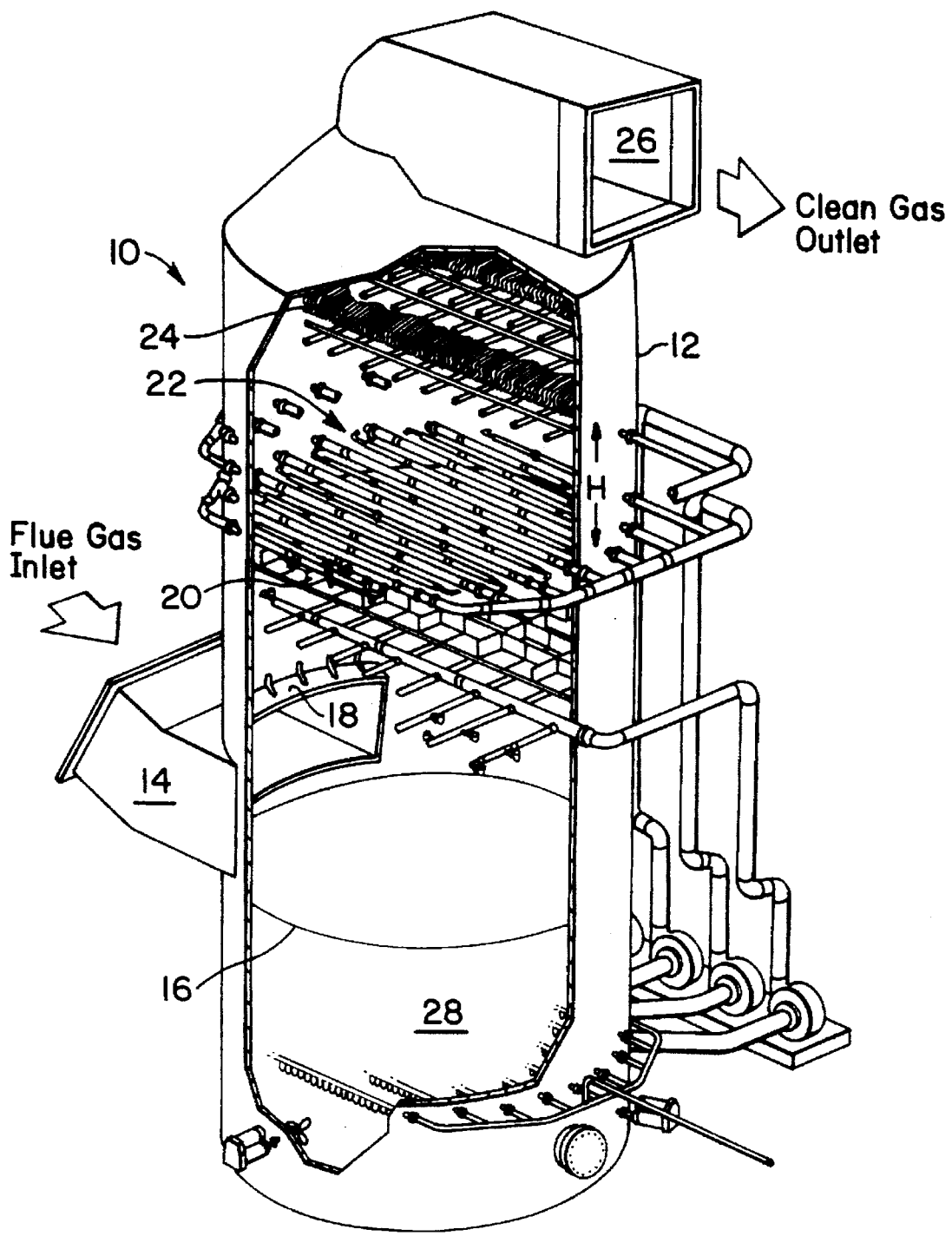
FIG. 1 is a schematic of a prior art wet flue gas desulfurization tower having a known side inlet.

Referring to FIG. 1, a flue gas desulfurization scrubber assembly 10 is shown in the form of a tower 12 having a flue gas inlet 14 located at a side of the tower 12 just above the water line level 16. The inlet 14 has an awning 18 extending into the tower 12.

Flue gas enters the side of the tower 12 at a temperature of 250° to 350° F. (121° to 177° C.) and is evaporatively cooled to its adiabatic saturation temperature by a slurry spray. The inlet 14 is designed to prevent deposition of slurry solids at the wet-dry interface. Because the inlet flue is at the flue gas temperature (for example 300° F.(149° C.)) and the shell of the scrubber is at the saturation temperature (typically 125° (52° C.)), there is a point where the surface temperature abruptly changes. Deposits are most likely to form at this point. Deposition is minimized by a combination of features which prevent periodic slurry splashing on the humid dry side of the wet-dry line.

Flue gas passes vertically upward through the tower with the gas flow more uniformly distributed by a perforated plate or sieve tray 20. This tray 20 serves as a gas-liquid contacting device. Gas-liquid contact is enhanced by a froth slurry which forms on the tray.

Above the tray 20 flue gases pass through several spray levels 22 where additional gas-liquid contact is achieved. Each spray level 22 consists of a set of known headers and spray nozzles. The spray nozzles( not shown) produce a relatively coarse spray with mass median drop diameters of about 2000 to 2500 microns. This suspension of droplets is in countercurrent flow contact with the flue gas for about one to three seconds. A majority of the absorption occurs during this short contact time. The spray zone in combination with froth slurry on the tray is referred to as the gas-liquid contact zone of the wet scrubber.

A disengagement height H is provided above the spray zone before the flue gases reach the mist eliminator 24. The purpose is to allow disengagement and return of the largest slurry droplets to the spray zone. For scrubber operating at an average gas velocity of 10 fpm (3 m/s), droplets larger than about 600 microns may have sufficient time to fall back to the spray zone.

The mist eliminator design in most wet scrubbers uses chevrons to remove additional moisture from the flue gas. Chevrons are closely spaced corrugated plates which collect slurry deposits by impaction. They efficiently collect droplets larger than about 20 microns in diameter to allow clean flue gas to be exhausted from outlet 26 of the tower 12.

Figure 3:
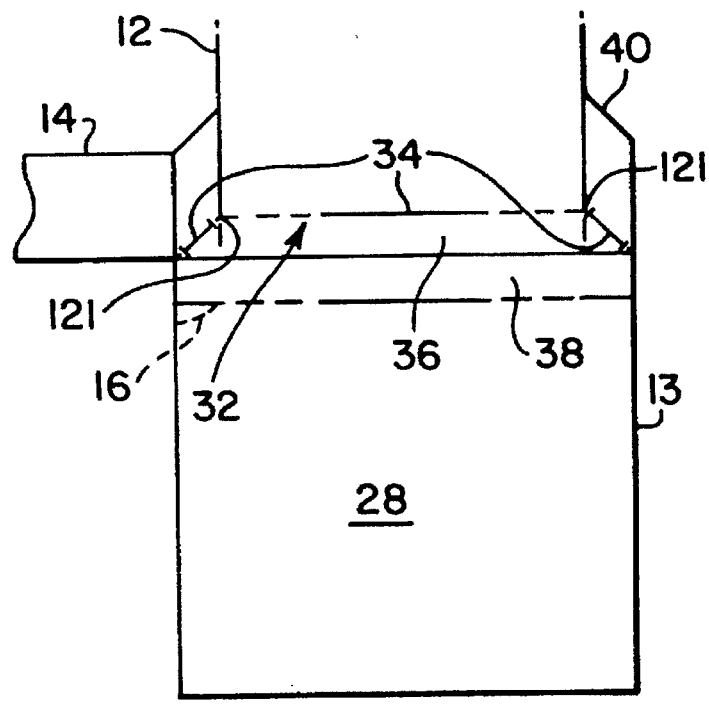
FIG. 3 is a side view of the FIG. 2 attachment located in the modified FIG. 1 tower.

The bottom 13 as seen in FIG. 3 is larger in diameter from the top absorber section of the tower 12 and has a maintained level of limestone and lime slurry 28 which is recirculated through the spray levels 22 by recirculation pumps 30.

Figure 2:
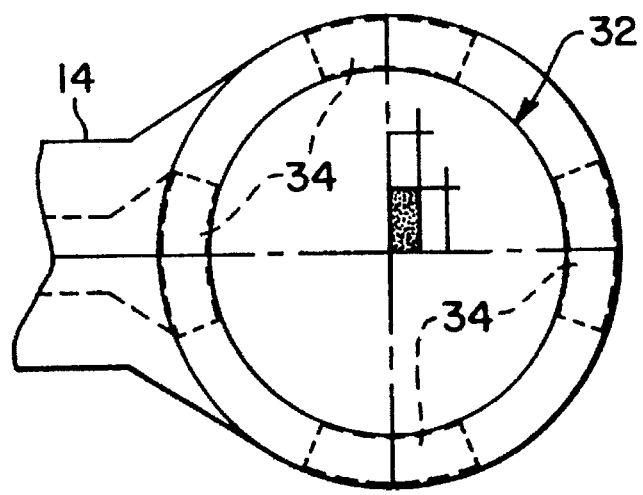
FIG. 2 is a top view of a distributed flue gas inlet attachment for the side inlet of the modified FIG. 1 tower.

To even out the flow distribution of the flue gas entering the inlet 14, an inlet extension assembly 32 is added to the inlet 14 as is best seen in FIGS. 2 and 3. The assembly 32 is mounted on the bottom section 13 of the tower and has a plurality of individual flue outlets 34. The open area of the outlets 34 closer to the inlet 14 are made smaller in open area than the back outlets 34 to provide an even flue gas flow from the plurality of outlets 34. The outlets 34 are located under an inclined transition surface 36 between the flared tank section 13 and the absorption section of the tower 12. The incoming flue gas exits in the spacer on top of the liquid to an artificial plenum formed by the tank walls flue gas exits and the lower portion of the absorption section 12 that extends below the open area outlet. The outlets 34 are located radially around the circumference of the inclined transition 36 between the slurry 28 tank and the absorption section of the tower 12. The size, number and location of the openings varies from the front of the absorber (the direction where the gas flue comes) to the rear. As was mentioned earlier, the front openings are smaller than the back ones to force the gas through the plenum 38 to the back of the absorber. Splitters (not shown) are located at proper locations and are used to help redistribution of the gas.

The bottom edge of the absorption section 121 of the absorber extends 6 to 8 inches below the interface with the assembly piece 32 forming a lip to prevent back flow of slurry on the inside surfaces of the incline. The number and flow area of the openings will determine the entering gas velocity so that 3000 to 4500 fpm is maintained without increase in the absorber height. The falling slurry film falling off the walls of the absorption section and the lower portion is thinner than the curtain normally falling from the awning of known absorbers and is evenly distributed along the perimeter of the absorber providing an equal resistance to the entering gas, thus, preventing channeling of the gas through zones of low resistance.

Figure 4:
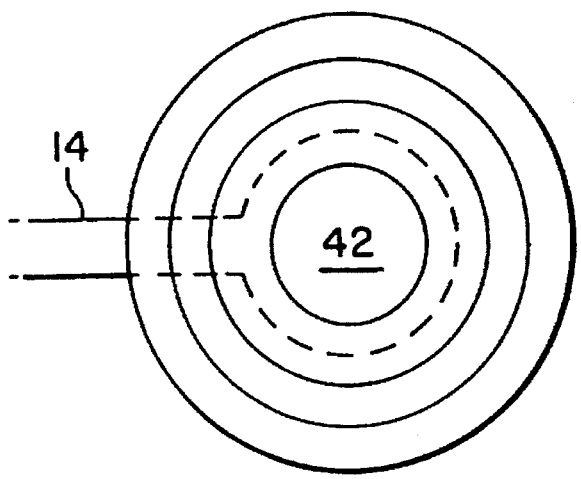
FIG. 4 is a top view of a centrally located flue gas inlet attachment for the side inlet of the modified FIG. 1 tower.
Figure 5:
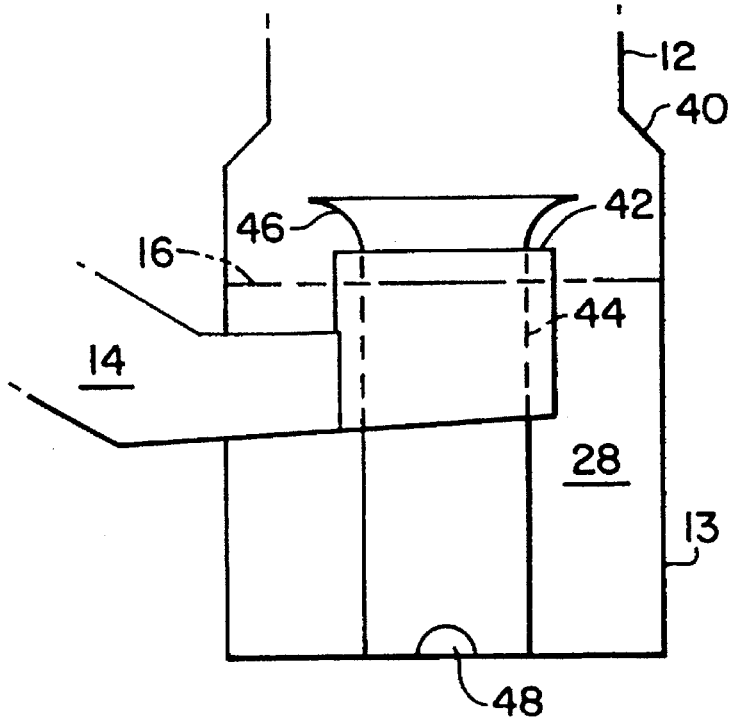
FIG. 5 is a side view of the FIG. 4 attachment located in the modified FIG. 1 tower.

Another embodiment of the present invention utilizes a center outlet 42 and is best seen in FIGS. 4 and 5. In this arrangement the inlet 14 penetrates the absorber under the liquid level 28 in the slurry tank. The inlet 12 wraps as a spaced tube around a vertical well 44 in the center of the slurry tank 28 and forms an annulus there between for flue gas extending around the vertical well 44. The outer walls of the concentric gas inlet extends above the liquid level 16 at the center of the absorber. The top of the well 44 has a flared outlet 46 to cover the gas inlet. The flared outlet 46 is provided to protect the annular outlet from falling slurry. The outlet 44 and the flared section 46 are located above the liquid level 16 and below the transition between the slurry tank and the absorption section of the absorber tower 12. The contraction of the absorber help to redirect some of the gas towards the center of the absorber. The 360 degree outlet allows the distribution of gas to be more even. The slurry falling off the inlet cover flared section 46 forms a continuous thin humidifying film and performs the same function as a conventional tower awning 18. The bottom of the well 44 has slots 48 to allow the slurry collected in the well to mix with the rest of the slurry tank. The entering flue gas is forced towards the walls of the tank and tends to hug the walls.

From the foregoing it will be seen that both embodiments of the described flue gas distribution means provide the following advantages:

1. The gas velocity of the gas at the inlet can be controlled without increase in the absorber height.

2. Control the gas velocity through the inlet helps controlling the inlet pressure drop.

3. Material for the other circumference inlet is potentially less expensive than the center inlet.

4. Distributing the gas around the circumference of the absorber or from the center of the absorber provides means to evenly distribute the gas across the absorber cross sectional area.

5. Humidification of the gas is achieved by the slurry falling off the walls into the gas stream.

6. The even distribution of the gas through the absorber allows maximum contact between the gas and the slurry.

7. Even distribution of the gas provides even gas velocity in the absorber, thus avoiding higher than average velocity pockets that affects the performance of the mist eliminator.

8. The center inlet is expected to be of lower pressure drop than the circumference inlet and conventional awning inlets. However, the pressure drop of both inlets is expected to be less than that of a traditional single inlet with an awning.

Certain modifications and additions have been deleted herein for the sake of conciseness and readability but are intended to fall within the scope of the following claims. As an example it is possible to use both of the flue gas distribution embodiments in the same tower simultaneously.

What is claimed is:

1. An inlet assembly for an absorption tower of a flue gas desulfurization system comprising:

a flue gas inlet located at the side of the tower;

a tubular well extending partially up from the bottom of the tower;

a circular tube extending partially around said tubular well to form an annular section sealed at one end and circumferentially open at the other end; and means for communicating flue gas from said inlet to the annular section of said circular tube to provide an even exhaust of the flue to the tower from the open end of said circular tube.

2. An inlet assembly as set forth in claim 1 wherein said well has a flared section at the top thereof spacedly extending over the open end of said circular tube.

3. An inlet assembly as set forth in claim 2 wherein said tubular well is hollow and has openings at the bottom thereof to communicate fluid from the bottom of said well to said tower.

4. An inlet assembly as set forth in claim 3 wherein the tower has a liquid slurry portion at the bottom thereof and said flared section of said well extends above the liquid level of the slurry portion of the tower.

5. An inlet assembly as set forth in claim 4 wherein the open end of said circular tube extends above the liquid level of the slurry portion of the tower and spacedly below the flared portion of said well.

6. An inlet assembly as set forth in claim 5 wherein the tower has a bottom section wider than said top section connected by an upwardly tapering section and wherein the flared portion of said well is centrally located in the bottom section of the tower slightly below the upwardly tapering section of same.

7. An inlet assembly for a wet flue gas desulfurization assembly comprising:

a tubular absorption tower having a desulfurization liquid at the bottom thereof recirculated through a series of spray nozzles therein;

a flue gas inlet located in the lower portion of said absorption tower for supplying flue gas to said tower for treatment therein; and means for evenly distributing the flue gas supplied to said tower to the spray nozzles of the tower for even treatment thereby, said distributing means including tubular means for centrally exhausting flue gas to said tower for treatment by the recirculated liquid therein, said tubular means being a centrally located well having a tubular section partially covering a top portion thereof to provide an annular opening therebetween.

* * * * *